USOO5701453A

United States Patent [19]
Maloney et al.

[11] Patent Number: 5,701,453
[45] Date of Patent: Dec. 23, 1997

[54] LOGICAL SCHEMA TO ALLOW ACCESS TO A RELATIONAL DATABASE WITHOUT USING KNOWLEDGE OF THE DATABASE STRUCTURE

[75] Inventors: Christopher W. Maloney, Overland Park, Kans.; Brian D. Jackson, Belton, Mo.; Kevin B. Mayfield, Lenexa, Kans.; Mark A. Mills, Stillwell, Kans.; Kent A. Tracy, Lenexa, Kans.

[73] Assignee: Informix Software, Inc., San Carlos, Calif.

[21] Appl. No.: 86,001

[22] Filed: Jul. 1, 1993

[51] Int. Cl.⁶ ............................................. G06F 17/30
[52] U.S. Cl. ............... 395/602; 395/604; 395/611; 395/613; 395/348; 395/352
[58] Field of Search ............................. 395/600, 425, 395/400, 700, 161, 602, 604, 611, 613, 607, 348, 352; 364/419, 578, 192

[56] References Cited

U.S. PATENT DOCUMENTS

| | | | |
|---|---|---|---|
| 4,967,341 | 10/1990 | Yamamoto et al. | 395/602 |
| 5,133,068 | 7/1992 | Crus et al. | 395/611 |
| 5,193,182 | 3/1993 | Bachman et al. | 395/611 |
| 5,197,005 | 3/1993 | Shwartz et al. | 395/602 |
| 5,257,185 | 10/1993 | Farley et al. | 395/602 |
| 5,276,870 | 1/1994 | Shan et al. | 395/602 |
| 5,301,315 | 4/1994 | Pellicano | 395/604 |
| 5,369,761 | 11/1994 | Conley et al. | 395/602 |
| 5,418,950 | 5/1995 | Li et al. | 395/604 |
| 5,428,776 | 6/1995 | Rothfield | 395/604 |
| 5,455,945 | 10/1995 | VanderDrift | 395/604 |
| 5,511,186 | 4/1996 | Carhart et al. | 395/602 |

OTHER PUBLICATIONS

"DATAPLEX: an access to heterogeneous distributed databases" by Chin-Wan Chung, Communications of the ACM, v33, n1, p. 70(11), Jan. 1990.

*An Introduction to UNIFACE*, Uniface Corporation, Alameda, CA, Jun., 1992, pp. 1–64.

Primary Examiner—Thomas G. Black
Assistant Examiner—Hosain T. Alam
Attorney, Agent, or Firm—Fish & Richardson P.C.

[57] ABSTRACT

Logical schemas are used to allow an end user the ability to access and manipulate relational database data without knowledge of the structure of the relational database. A logical schema is first created specifying which tables are available to an end user, and the relationships between columns of those tables. The logical schema defines a structure for the data fields having a master level and a plurality of detail levels. An end user may manipulate the logical schema using a graphical interface to build customized forms, reports, and queries. An end user is not required to be familiar with a database query language, such as SQL, or the structure of the relational database.

11 Claims, 12 Drawing Sheets

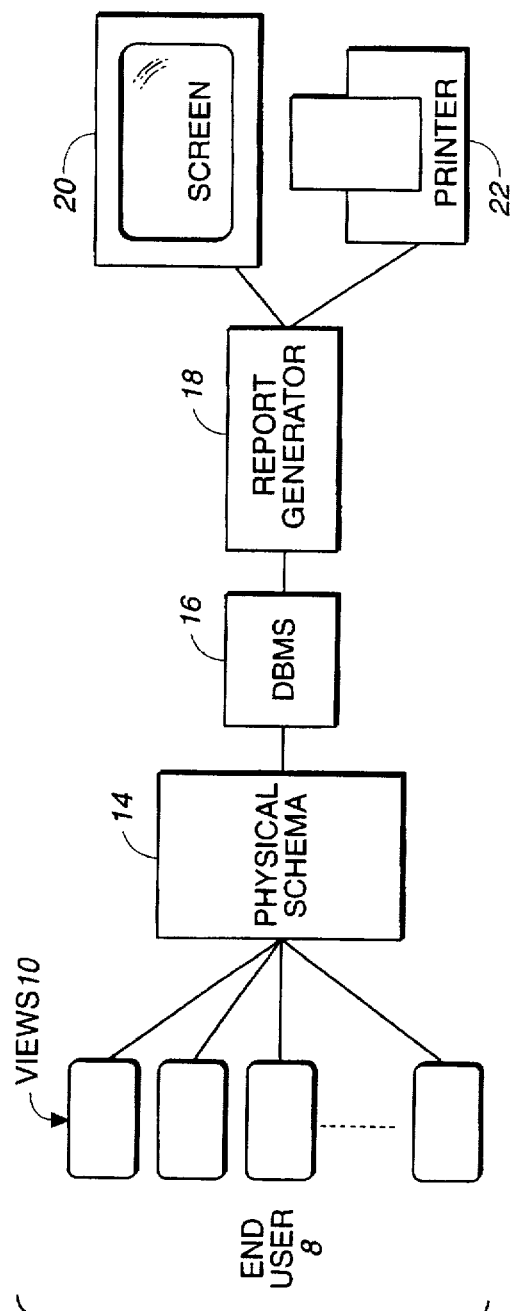
FIG._1
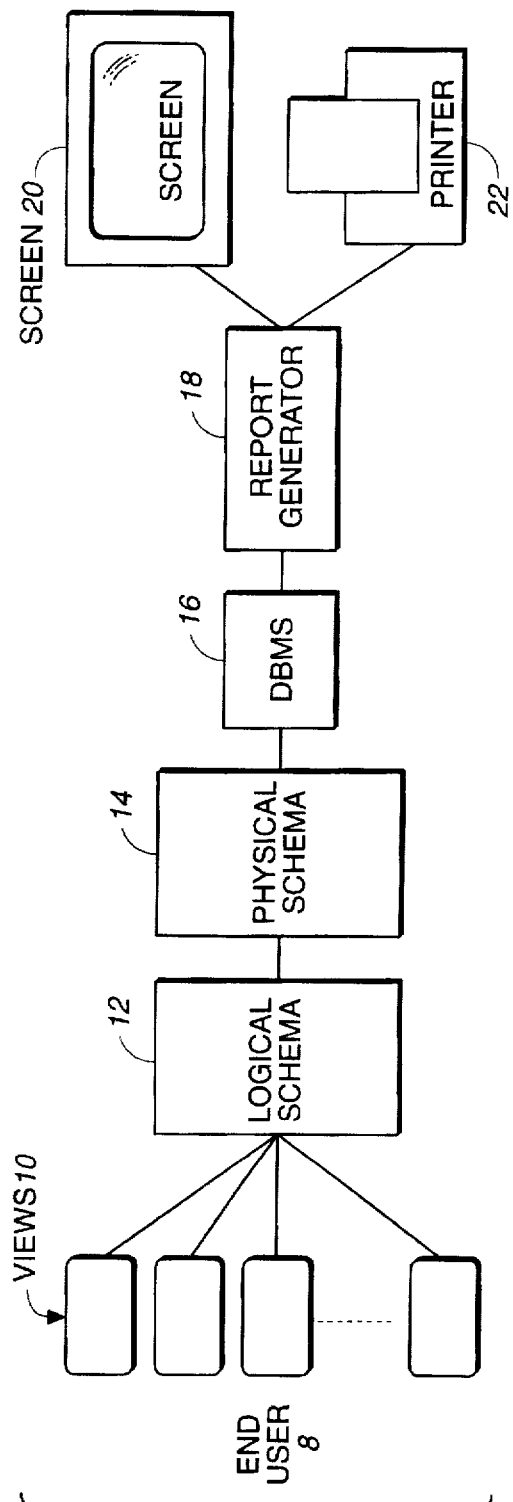
FIG._2

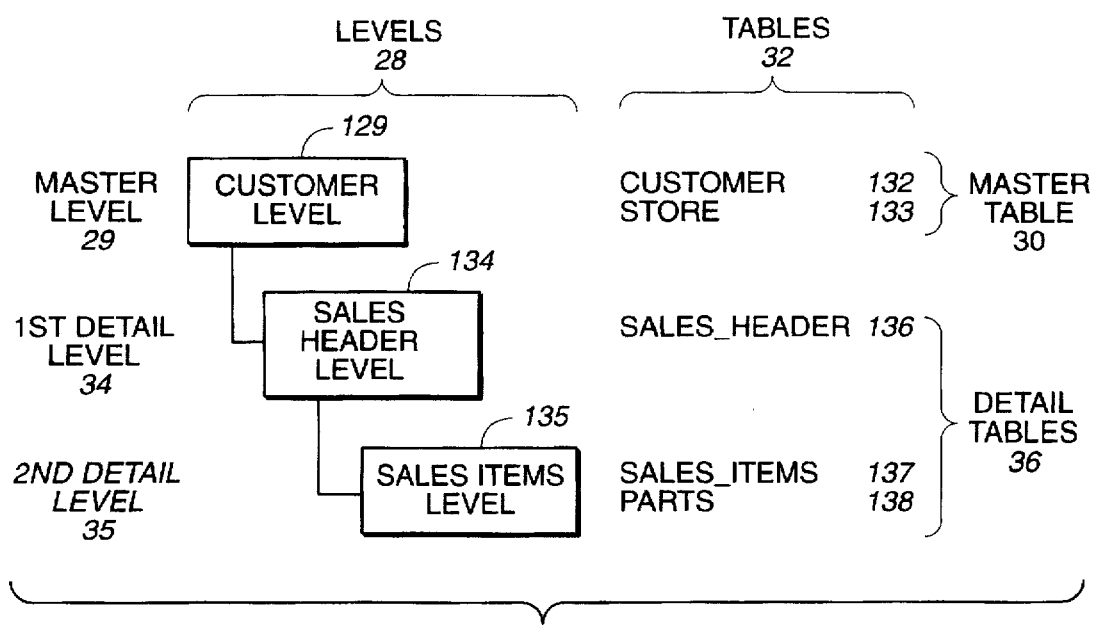
FIG._3
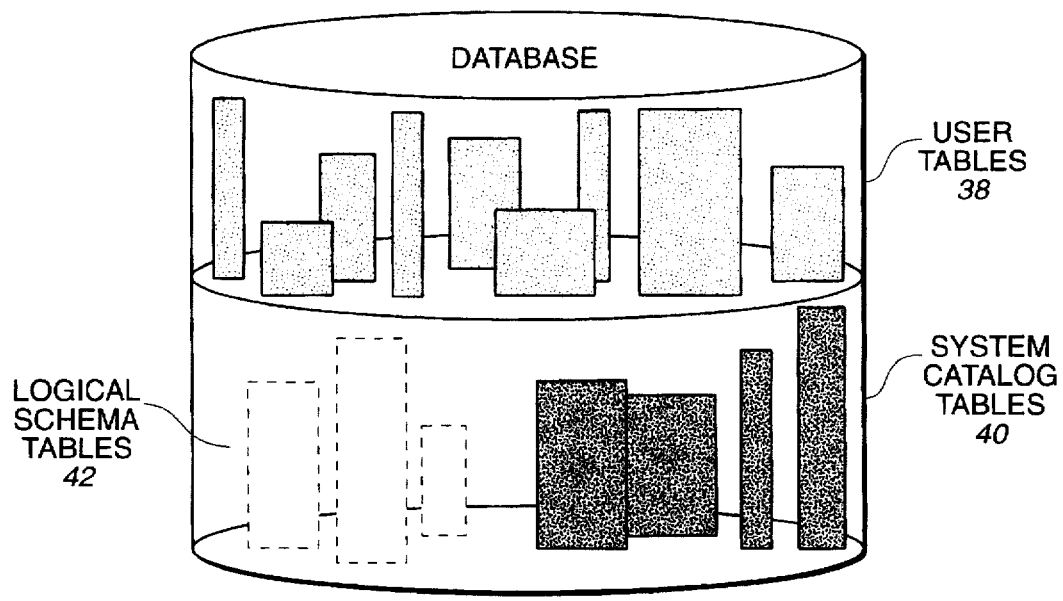
FIG._4A

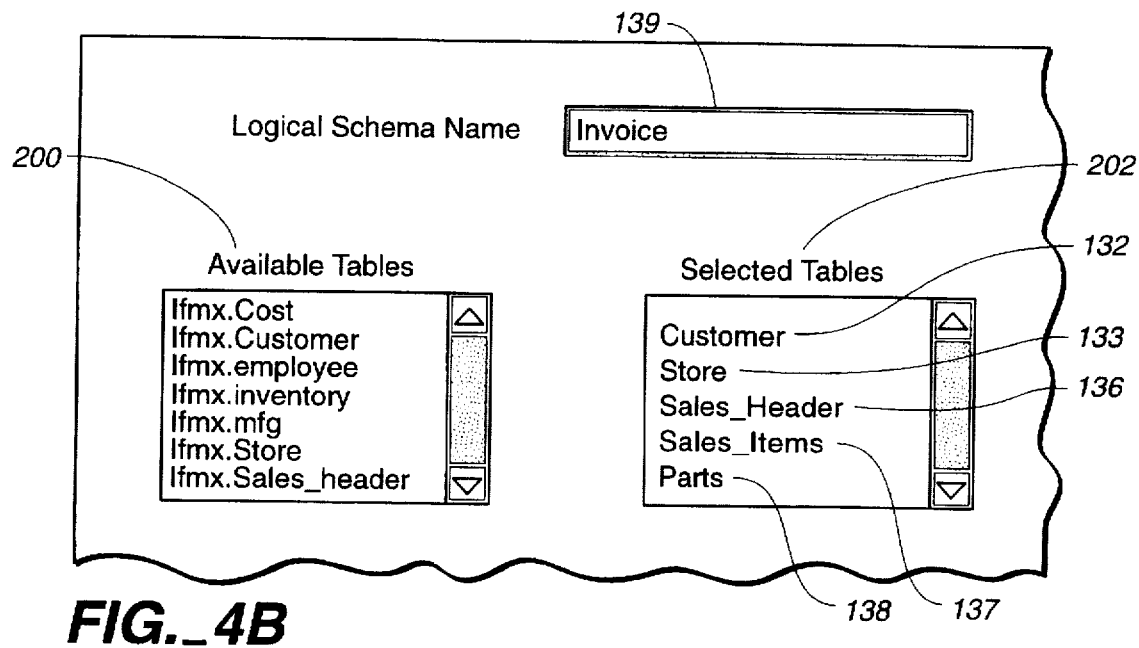
FIG._4B
| Column Name | Type | Description |
|---|---|---|
| svwid | serial | Logical Schema identifier |
| owner | char (32) | Logical Schema owner |
| svwname | char (32) | Short name of Logical Schema name: unique within syssuperviews.svwname |
| remarks | char (72) | Logical Schema description (narrative) |
| Index Name | Type | Columns |
| superview1 | unique | svwid |
| superview2 | unique | svwname |
FIG._5

| Column Name | Type | Description |
|---|---|---|
| svwid | int | Logical Schema identifier |
| tableseq | int | table instance identifier unique within svwid |
| owner | char (32) | reference to owner in systables |
| tabname | char (32) | reference to tabname in systables |
| masteralias | char (32) | tabalias of table that is "master" of this table. |
| cardinality | char (1) | number of rows per master row. 1=always 1; 0=0 or 1; n=0 or more; N=1 or more; M=master. There should only be one master per Logical Schema. For master, the masteralias is NULL. |
| usetype | char (1) | (L) ookup only, (U) pdate |
| tabalias | char (32) | alias name, defaults to table name |
| levelname | char (32) | grouping name for all columns joined at this level. |
| remarks | char (72) | table instance description (narrative) |
| Index Name | Type | Columns |
| svwtables1 | unique | svwid, tabalias |
| svwtables2 | unique | svwid, tableseq |

*FIG._6*

| Column Name | Type | Description |
|---|---|---|
| svwid | int | Logical Schema identifier |
| tabalias | char (32) | table alias within svwid |
| jcolseq | smallint | join column identifier unique within svwid, tabalias |
| mastercol | char (32) | column within master table |
| detailcol1 | char (32) | first join column in detail table |
| detailcol2 | char (32) | reserved |
| joinoperator | char (2) | join operation between columns: (=), (!=), (<>), (>), (>=), (<), (<=), |
| Index Name | Type | Columns |
| svwjoins1 | unique | svwid, tablalias, jcolseq |

*FIG._7*

| Column Name | Type | Description |
|---|---|---|
| svwid | int | Logical schema identifier |
| tabalias | char (32) | joins to syssvwtables.tablalias |
| colseq | int | orders columns |
| colname | char (32) | reference to syscolumns.colname |
| colalias | char (32) | Logical Schema alias for the table/column |
| label | char (32) | label for the alias (left of field) |
| title | char (32) | title for the alias (above field) |
| flag | smallint | used with views and synonyms |
| Index Name | Type | Columns |
| svwaliases1 | unique | svwid, tabalias, colname |
| svwaliases2 | unique | svwid, colalias |
| svwaliases | dup | svwid, colseq |

*FIG._8*

| Column Name | Type | Description |
|---|---|---|
| svwid | int | Logical Schema identifier |
| seqno | smallint | line number of the order by text |
| colalias | char (32) | reference to syssvwaliases.colalias |
| sorttype | char (1) | (A) sending or (D) escending |
| Index Name | Type | Columns |
| svworder1 | unique | svwid, seqno |

FIG._9

| Column Name | Type | Description |
|---|---|---|
| svwid | int | Logical Schema identifier, 0 for all Logical Schemas |
| username | char (32) | user login identifier, public for all users |
| svauth | char (8) | Authorization type |
| rowlimit | int | row limit for a query on this Logical Schema |
| readlimit | int | read limit |
| readsperrowlimit | float | reads per row limit |
| elapsedtimelimit | int | elapsed time in seconds |
| isolationmode | smallint | Types: (1) Logical Schema record stability, (2) committed read, (3) query stability |
| Index Name | Type | Columns |
| sysvwauthindex | unique | svwid, username |

| svwid | Owner | Svname | Remarks |
|---|---|---|---|
| 1 | Ifmx | Invoice | ········ |

FIG._12A

| svwid | tableseq | Owner | tabname | masteralias | cardinality | usetype | tabalias | levelname | remarks |
|---|---|---|---|---|---|---|---|---|---|
| 1 | 0 | Ifmx | Customer | NULL | NULL | L | Customer | NULL | ··· |
| 1 | 0 | Ifmx | Store | NULL | NULL | L | Store | NULL | ··· |
| 1 | 0 | Ifmx | Sales_Header | NULL | M | L | Sales_Info | NULL | ··· |
| 1 | 0 | Ifmx | Sales_Items | NULL | NULL | L | Sales_Items | NULL | ··· |

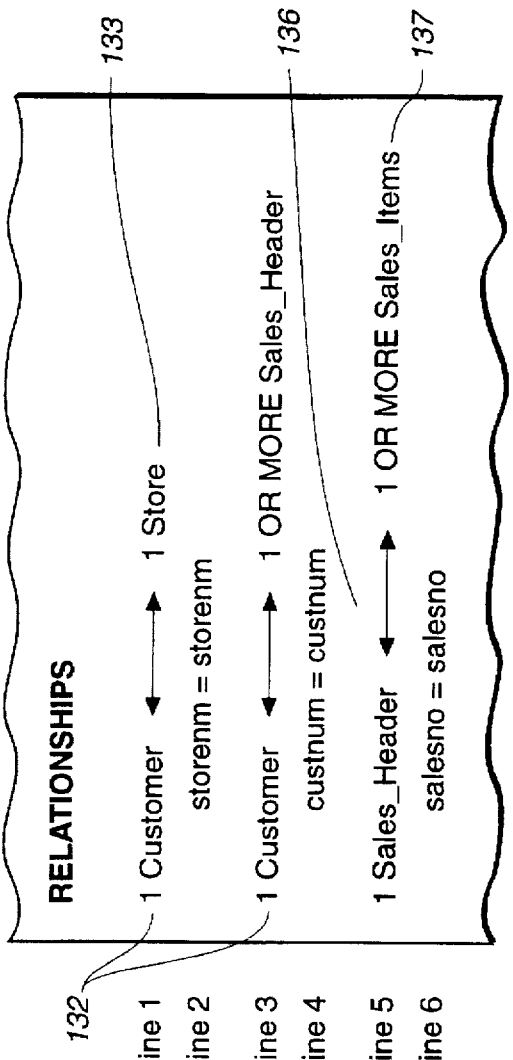

FIG._14

RELATIONSHIPS

Line 1    1 Customer ⟷ 1 Store
Line 2              storenm = storenm

Line 3    1 Customer ⟷ 1 OR MORE Sales_Header
Line 4              custnum = custnum Line 5    1 Sales_Header ⟷ 1 OR MORE Sales_Items
Line 6              salesno = salesno

| Customer Table *132* |
|---|
| lname<br>fname<br>address<br>phone<br>city<br>state<br>storenm<br>custnum |
| Store Table *133* |
| storenm<br>storeid<br>storaddr |
| Sales_Header Table *136* |
| storeid<br>salesdate<br>salesprsn<br>salesno<br>custnum |
| Sales_Items Table *137* |
| itemnm<br>salesno<br>itemno<br>price<br>qty<br>dscrptn |

*FIG._12B*

| svwid | tabalias | colseq | colname | colalias | label | title | flag |
|---|---|---|---|---|---|---|---|
| 1 | Customer | 0 | lname | lname | lname | lname | 0 |
| 1 | Customer | 0 | fname | fname | fname | fname | 0 |
| 1 | Customer | 0 | address | address | address | address | 0 |
| 1 | Customer | 0 | phone | phone | phone | phone | 0 |
| 1 | Customer | 0 | city | city | city | city | 0 |
| 1 | Customer | 0 | state | state | state | state | 0 |
| 1 | Customer | 0 | storenm | storenm | storenm | storenm | 0 |
| 1 | Customer | 0 | custnum | custnum | custnum | custnum | 0 |
| 1 | Store | 0 | storenm_ | storenm_ | storenm_ | storenm_ | 0 |
| 1 | Store | 0 | storeid | storeid | storeid | storeid | 0 |
| 1 | Store | 0 | storaddr | storaddr | storaddr | storaddr | 0 |
| 1 | Sales_Info | 0 | storeid_ | storeid_ | storeid_ | storeid_ | 0 |
| 1 | Sales_Info | 0 | salesdate | salesdate | salesdate | salesdate | 0 |
| 1 | Sales_Info | 0 | salesprsn | salesprsn | salesprsn | salesprsn | 0 |
| 1 | Sales_Info | 0 | salesno | salesno | salesno | salesno | 0 |
| 1 | Sales_Info | 0 | custnum_ | custnum_ | custnum_ | custnum_ | 0 |
| 1 | Sales_Items | 0 | itemnm | itemnm | itemnm | itemnm | 0 |
| 1 | Sales_Items | 0 | salesno_ | salesno_ | salesno_ | salesno_ | 0 |
| 1 | Sales_Items | 0 | itemno | itemno | itemno | itemno | 0 |
| 1 | Sales_Items | 0 | price | price | price | price | 0 |
| 1 | Sales_Items | 0 | qty | qty | qty | qty | 0 |
| 1 | Sales_Items | 0 | dscrptn | dscrptn | dscrptn | dscrptn | 0 |

FIG._13

| svwid | tableseq | Owner | tabname | masteralias | cardinality | usetype | tabalias | levelname | remarks |
|---|---|---|---|---|---|---|---|---|---|
| 1 | 1 | Ifmx | Customer | NULL | M | L | Customer | Customer | -- |
| 1 | 2 | Ifmx | Store | Customer | 1 | L | Store | Customer | -- |
| 1 | 3 | Ifmx | Sales_Header | Customer | N | L | Sales_Info | Sales_Info | -- |
| 1 | 4 | Ifmx | Sales_Items | Sales_Info | N | L | Sales_Items | Sales_Items | -- |

*FIG._15*

| svwid | tabalias | jcolseq | mastercol | detailcol1 | detailcol2 | joinoperator |
|---|---|---|---|---|---|---|
| 1 | Store | 1 | storenm | storenm_ | NULL | = |
| 1 | Sales_Info | 1 | custno | custno_ | NULL | = |
| 1 | Sales_Items | 1 | salesno | salesno_ | NULL | = |

*FIG._16*

| svwid | seqno | colalias | sortype |
|---|---|---|---|
| 1 | 1 | lname | A |
| 1 | 2 | itemnm | A |

*FIG._17*

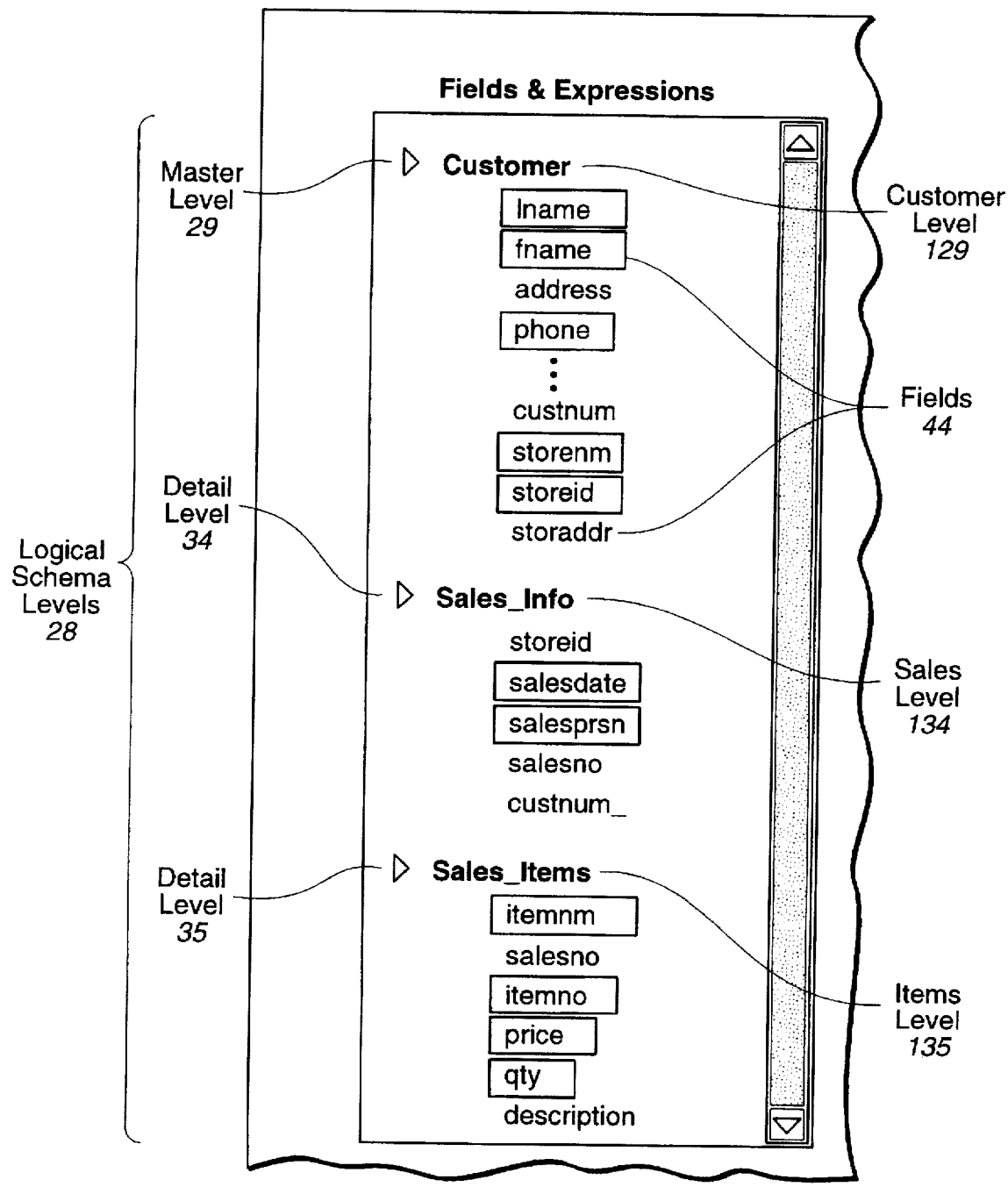
FIG._18

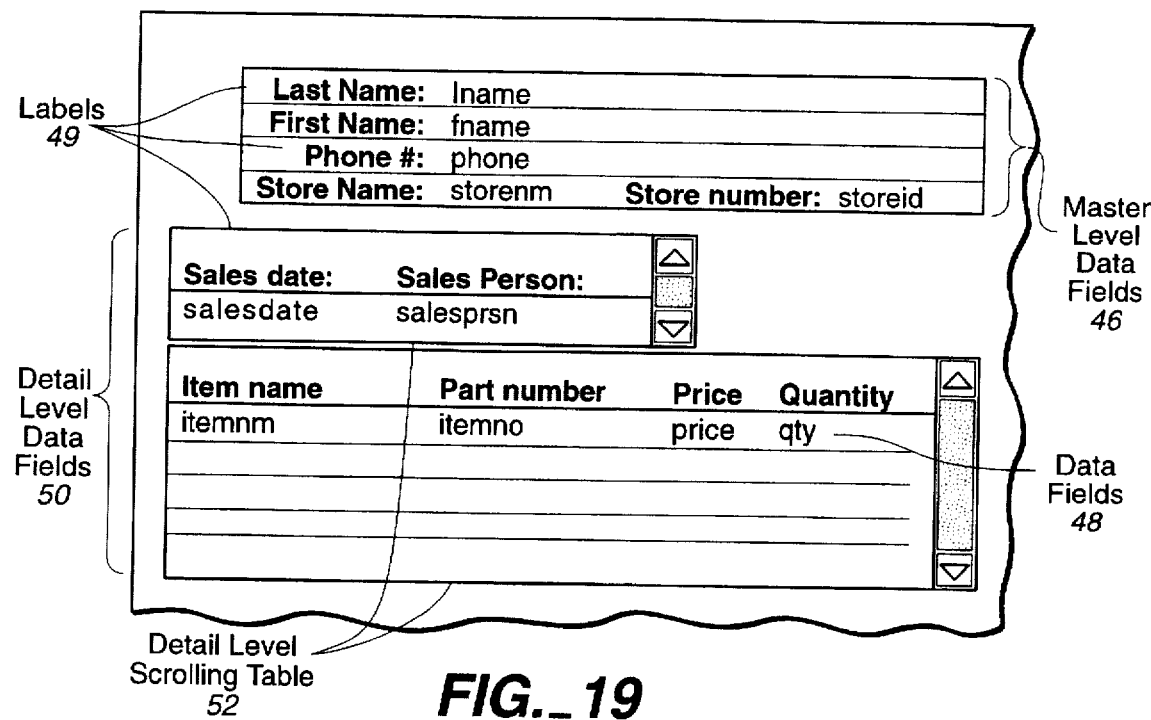
FIG._19
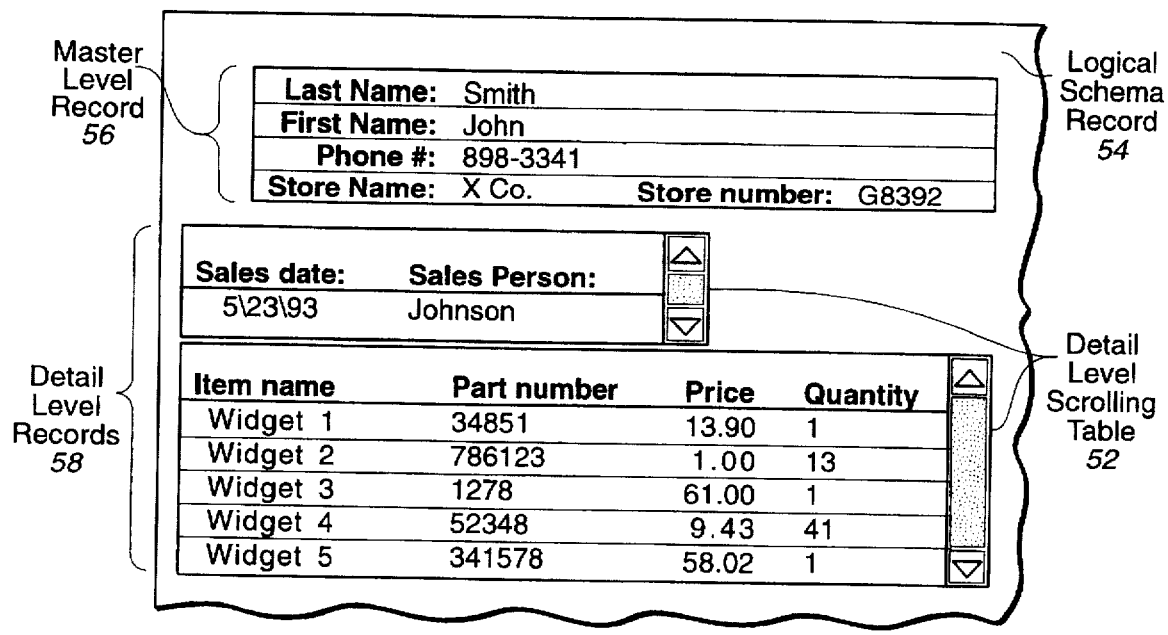
FIG._20

LOGICAL SCHEMA TO ALLOW ACCESS TO A RELATIONAL DATABASE WITHOUT USING KNOWLEDGE OF THE DATABASE STRUCTURE

BACKGROUND OF THE INVENTION

This invention relates to computerized databases, and more particularly to a system and method of retrieving data in a relational database using a graphical user interface.

A database system is a computerized system whose overall purpose is to maintain information and to make that information available on demand. Many of the database products developed today are based on what is called the relational approach. In a conventional relational system the data is perceived by the user as tables. A table is comprised of a row of column headings, and zero or more rows of data values. The rows of the table may be referred to as records, while each column represents a field of those records.

All access to the database is handled by a database management system (DBMS). Using the DBMS, users of application programs perform operations on the database such as storing, editing, updating, inserting, deleting, and retrieving data by issuing requests or commands called queries. The database language known as SQL (structured query language) is the standard language for interacting with database systems, and is utilized by most commercial database systems.

From a high level point of view, database systems have a two part structure consisting of the DBMS and the interface to the DBMS. Interfaces are various applications that enable users to control the DBMS.

Database products are used by a wide variety of entities; large companies, for instance, store large amounts of information in corporate databases. In general, there are two types of employees that may use the corporate database.

A person known as a database administrator (DBA) or system programmer is required to create, maintain and implement the database. For large entities, the DBA function may be performed by a team of individuals. However, for simplicity the DBA is considered to be a single individual in the following description.

Besides the DBA, the second type of user to interact with the database system is the end user. End users can access the database via a separate application program, or through an interface provided as part of the database system software.

For more background on relational databases and the SQL language, see Date C.J., An Introduction to Database Systems; The Systems Programming Series, vol. 1, 5th Ed., Addison-Wesley Publishing Company, 1990, which is herein incorporated by reference.

Several problems have been associated with conventional relational database management systems. In some prior approaches, end users mainly access data in the database through the use of a database query language, such as SQL. The problem with these command driven interfaces is that they require a certain amount of data processing expertise on the part of the end user.

Other types of relational databases, or applications, include a graphical user interface (GUI) that allow users to interact with items that appear on the computer screen, rather than requiring users to memorize the names of commands. Using a GUI, end users interact with the database by choosing an item from a menu, filling in information on a form, or interacting with a dialog box. A dialog box is a type of window, invoked by a command, that accepts responses needed to carry out a particular command.

Despite the improvement over command line interfaces, GUIs suffer a drawback in that end users are still required to have knowledge of the physical structure of the database. In other words, the end user must know the names of, and relations between database tables and columns before being able to access data in the database.

The way in which a database is structured, i.e., the relationships between tables and columns, is known as the physical schema of the database. The physical schema should be designed so that all user applications, which retrieve and manipulate data, may do so in a convenient manner. The convenience provided by such a database design, however, diminishes over time as the database matures, since as tables and columns are added, deleted and modified, the original physical schema may no longer provide efficient access to information. The data may still be obtained, but the user may have to retrieve the data by joining, i.e., jumping from table to table. This joining process requires additional steps due to the fact that the database schema was not initially designed to manipulate the new relations among the tables. Thus, schema navigation becomes more difficult as the system matures and more applications are added.

The physical database schema cannot be restructured from year to year in order to solve this problem. This is especially true of a real-time production databases supporting day-to-day operations, as companies are generally reluctant to halt a production database and replace it with a new application that may contain bugs. As a result, the database schema becomes more and more complicated over time, and eventually only a few system programmers in the company may have the necessary knowledge to perform database operations. End users must therefore send database queries to these programmers, and as they become busier, a backlog of requests may be accumulated.

GUIs that display a list of table and column names for the end user do not solve this problem. Most end users are not sophisticated database users and need to view data in familiar formats. For example, an end user may prefer to look at information in a format such as an invoice or purchaser order. The number of tables in a relational database and the relationships between those tables may seem arbitrary and confusing to end users. The challenge is then to provide an end user access to the data he wants without having to understand the physical database schema.

Accordingly, an object of the present invention is to provide improved access to relational databases.

A further object of the invention is to provide improved access for an end user without that user understanding the physical database schema.

Other objects, features and advantages of the present invention will become apparent from the following description when taken in conjunction with the accompanying drawings.

SUMMARY OF THE INVENTION

The present invention is a method for providing access to a relational database having data stored as physical database records in physical database tables. Pairs of tables which will comprise a logical schema are selected from the relational database and the logical relationships between pairs of tables are defined. The tables in each pair of tables are joined by selecting a field common to both tables. Once a join operator is selected for each join field, the logical relationship between the pairs of tables is stored in a relational database thereby creating a logical schema.

The present invention provides access to a relational database where an end user queries the database without knowledge or understanding of the physical database schema. A logical schema is created and displayed to an end user as a set of fields grouped by levels that denote logical relationships between the information.

An end user selects from a display those fields for which he wishes to see information. The database tables and columns corresponding to fields selected by the end user are then queried. The relationships between the data defined in the logical schema controls the order in which data is returned and presented to the end user.

Because actual table and column names are not used in the logical schema, the present invention masks the complexity of the physical database schema from the end user.

BRIEF DESCRIPTION OF THE DRAWINGS

The accompanying drawings, which are incorporated in and form a part of this specification, schematically illustrate embodiment of the invention and, together with the general description given above and the detailed description given below, serve to explain the principles of the invention:

FIG. 1 is a block diagram of a prior art database approach.

FIG. 2 is a block diagram illustrating the present invention.

FIG. 3 provides a graphical representation of the structure of logical schema in accordance with the principles of the present invention.

FIG. 4A is a block diagram representing how a logical schema is stored.

FIG. 4B depicts the "Available Tables" list and the "Selected Tables" list for a sample customer invoice database.

FIGS. 5–10 depict logical schema catalog tables.

FIG. 11 depicts a row of information inserted into the SYSSUPERVIEWS table for the "invoice" logical schema.

FIG. 12A depicts the SYSSVWTABLES table after rows of data have been inserted.

FIG. 12B depicts the tables and columns in a sample database.

FIG. 13 shows the SYSSVWALIASES table after being updated with table information.

FIG. 14 depicts the relationship definition for an "invoice" logical schema.

FIG. 15 shows the SYSVWTABLES table after being updated with relationship information.

FIG. 16 depicts the SYSSVWJOINS table after being inserted with join information from the a sample schema.

FIG. 17 shows the SYSSVWORDER table after a sort order has been defined for an "invoice" logical schema.

FIG. 18 depicts a sample dialog box for a logical schema.

FIG. 19 is a form produced from a sample Customer logical schema.

FIG. 20 depicts a sample form after records have been retrieved from the database.

DETAILED DESCRIPTION OF THE PREFERRED EMBODIMENTS

Reference will now be made in detail to a preferred embodiment of the invention. While the invention will be described in conjunction with a preferred embodiment, it will be understood that this description is not intended to limit the invention to that embodiment. On the contrary, the invention is intended to cover alternatives, modifications and equivalents, which may be included within the spirit and scope of the invention.

Overview

A conventional database is shown in FIG. 1. This database requires an end user to know the physical database schema, i.e., table and column names and relationships, before retrieving and viewing data contained in the database. An end user, denoted generally by reference numeral 8, is a person who queries the database to obtain specific information. In order to perform the query, he must first know a physical schema 14 of the database. A database management system (DBMS) 16 executes the user's query to the database (not shown) and sends the results to a report generator 18. Report generator 18 is an application program capable of building forms and reports. A form provides end user 8 with a window to the database, while a report is a document that allows end user 8 to format and print data retrieved from the database. Forms are usually sent to a computer screen 20 while reports are usually sent to a printer 22.

Each end user 8, of course, may desire to see different views of the data. The different ways an end user 8 may view the data is depicted in FIG. 1 as a set of boxes 10 between end user 8 and physical schema 14, each box 10 representing a different view.

Different end user views 10 can be illustrated by examining a hypothetical sound recording company. Assume the database administrator for the company produces a monthly report that displays sales of the company's compact discs grouped by artist. Assume further that a sales manager in the company needs to see the sales of only two artists over a six-month period. Although the sales manager's report queries the same tables, the DBA must generate a separate report to retrieve the specific information required by the sales manager. The two reports produced by the DBA represent separate end user views of the data stored in the company's database. The person who generates the reports must know the physical schema of the database to issue the query.

The operations and features of the present invention are illustrated by FIG. 2. As shown, end user 8 queries the database within the DBMs 16 through a logical schema 12. The logical schema 12 eliminates the requirement that end user 8 know the physical schema 14 before accessing data. Logical schema 12 is a set of instructions that defines the relationships between selected tables and column data in a relational database. In other words, logical schema 12 provides a set of rules to control how data is returned from the database.

The present invention is a method for providing access to a relational database which has data stored as physical database records in physical database tables. Pairs of tables comprising a logical schema are selected from the relational database and the logical relationships between the pairs of database and the logical relationships between the pairs of tables are defined. Each pair of tables is joined by selecting a field common to both tables. Once a join operator is selected for each join field, the logical relationship between the pairs of tables is stored in a relational database, creating a logical schema.

For example, a logical schema might model a purchase order or a sales invoice by specifying the invoice relationships between customers, orders, and sales items in the database.

Using the present invention, end user 8 can use a graphical user interface (GUI) to logical schema 12 to design custom forms and reports without knowledge of the database structure or actual table and column names. The end user 8 begins by specifying the database and logical schema 12 on which a document is to be based. End user 8 then selects the fields or columns he wants from a dialog box (not shown) that displays all the columns that are available in logical schema 12.

The dialog box groups columns according to a logical schema level, as explained in more detail below. In this approach, end user 8 does not need to know which table holds a specific item of data. He only needs to know which logical schema level contains the desired information. For example, to place customer information on a form, end user 8 simply selects displayed fields grouped under a heading named customer_info.

Instead of dealing with rows in individual tables, an end user deals with a logical schema record. A logical schema record consists of one master-level row and a number of dependent detail rows. For instance, a logical schema record could include all the sales for one customer and all the items for each of those sales. This may encompass many rows in several tables, but is presented to end user 8 as a single and simple logical schema record.

Before end user 8 can make use of logical schema 12, the schema must first be created. A person with knowledge of the physical schema, including a person who later becomes end user 8, can create a logical schema 12. Since in most large companies the task of creating logical schema 12 would be the responsibility of the DBA, the person who creates the logical schema 12 will, for the sake of convenience and not by the way of limitation, may hereinafter be referred to as the DBA.

When designing logical schema 12, the first task is to choose the tables an end user 8 needs to access. It must then be determined how the data in one table relates to data in another table by establishing the relationships between those tables. When the end user 8 sends queries to the database, the relationships established in logical schema 12 control the master-detail order of the data returned in response to those queries. This allows logical schema 12 to portray data having different levels of detail.

Before explaining what is meant by a master-detail order, it is necessary to first describe the relationships between database tables. In a database designed to follow the relational model, each row of data in a table has a number of potential relationships to the other rows of data. In other words, in addition to the individual entities recorded in the database, there are also relationships linking those entities together.

For example, a given database might hold information as to which customers ordered what sale items from which stores. A relationship exists between customers and stores: each store has customers that placed orders, and conversely, a customer may have placed orders in more than one store. Similarly, a sales item may be stocked in several stores, and conversely, a store may stock several sales items. These relationships may be traversed in either direction.

Relationships between entities, or fields, of a database are a part of the database just as the basic data entities are part the database. A relationship can be regarded as an entity of its own. For example, the relationship "sales item X is stocked in store Y" is an entity for which one may wish to record data, i.e. the corresponding quantity.

A logical schema is a named set of these types of relationships and provides a set of rules to control how data is returned from the database. The types of relationships between tables that can be defined in a logical schema are: One-to-One, One-to-Zero-or-One, One-to-Zero-or-More, and One-to-One-or-More.

A One-to-One relationship means that for every row in one table, there is only one row of related data in a second table. For example, a part may have only have one manufacturer.

A One-to-Zero-or-One relationship means that for every row of data in one table, there is no more than one row of related data in a second table or there may not be any related rows in the second table. For example, some but not all of the items in a catalog may have a corresponding picture.

A One-to-Zero-or-More relationship means that for every row of data in one table, there may or may not be multiple rows of related data in a second table. For example, some customers may have placed many orders, but there may be customers who have never placed orders.

A One-to-One-or-More relationship means that for every row of data in one table, there is one or more rows of related data in a second table. For example, every order must have at least one item on it, and an order can have many items.

The relationship between tables can vary depending on the purpose of the logical schema. For example, if a logical schema is created that looks at all customers and their orders, then the table holding the customer information has a One-to-Zero-or-More relationship to the table holding the order information. However, if a logical schema looks at all the orders a company fills and the customers that placed the orders, the order table has a One-to-One relationship to the customer table.

After data has been modeled in the database by defining logical schema 12, end user 8 can use that model to create any form, report, or query that looks at the data in the same logical way. In the sound recording company example given above, a logical schema could be created that displays the monthly sales of compact discs grouped by artist. Although the sales manager may need a specialized view of the data, the logical schema would enable the sales manager to personally choose information he needs without the help of a DBA, for instance, and his specialized knowledge of the physical database schema.

The number of logical schemas to be created for a database is determined by the requirements of the end user. For example, only one logical schema for each department in a company may suffice, but if end users within the same department require different types of information, then additional logical schemas can be created to satisfy those needs.

Logical Schema Structure

As shown in FIG. 3, a sample logical schema may include five tables denoted collectively by reference numerical 32: a customer table 132, a store table 133, a sales_header table 136, a sale_items table 137, and a parts table 138.

In relational databases, tables are joined by one or more columns that contain the same values. For example, customer table 132 and sales_header table 136 can be joined by a column named cust_no. The value of this column in both tables must match to relate the rows from the two tables.

The table joins are specified in a logical schema of the present invention when the relationships among the tables is defined. Since the joins may be previously defined, all end users 8 need to understand when building forms or reports is the logical levels 28 into which the data is organized. For example, they must know that for every customer there may be 0 or more sales, and each sale consists of 1 or more items.

The first level in a logical schema is known as the master level 29. Master level 29 contains a logical schema master table 30. All other tables 32 in the logical schema join directly or indirectly to the master table 30. In the example, the logical schema organizes all the data according to its relationships to rows in customer table 132. Therefore, customer table 132 is the logical schema master table 30.

A new logical schema level is created each time a One-to-Zero-or-More or One-to-One-or-More relationship between tables is established. Any new logical schema level under master level 29 is called a detail level. The levels are ordered according to how the tables in the level are joined to master table 30.

In the example of FIG. 3, two detail levels exists, a first detail level 34 and a second detail level 35. Each row in the customer table. 132 may have zero or more corresponding rows in sales_header table 136. If a customer has not made any purchases then that customer would not have any rows in the sales_header table 132. Therefore, this One-to-Zero-or-More relationship between tables 132 and 136 spawns a first detail level 34. Likewise, each row in sales_header table 136 may have one or more corresponding rows in sales_items table 137 (a One-to-One-or-More relationship), so it spawns a second detail level 35.

Tables joined on a One-to-One or One-to-Zero-or-One relationship appear on the same logical schema level. In FIG. 3, one row in customer table 132 relates to one row in store table 133, i.e., a One-to-One relationship exists between tables 132 and 133. Therefore, store table 133 belongs in the same level as customer table 132. Likewise, parts table 138 has a One-to-One relationship to sales items table 137 so it belongs in the same level as sales items table 137.

In a preferred embodiment, logical schema levels are automatically named by default. Each level may be given the name of the first detail table 36 assigned to that level. The exception to this is master level 29 of the logical schema which assumes the name of master table 30. In a preferred embodiment, logical schema levels 28 may be renamed to make them more meaningful to the end users. In FIG. 3, customer table 132 is the first table assigned to the logical schema master level 29, so the name of the master level of the logical schema is "customer level" 129. The sales header table 136 is the first, and only, table assigned to the first detail level 34, so the name of the first detail level 34 of the logical schema is "sales header level" 134. The Sales_items table 137 is the first table assigned to the second detail level 35, so the name of the second detail level 35 of the logical schema is "sales items level" 135.

Logical Schema Creation

To create a logical schema, the structure and contents of the database must be known. In a preferred embodiment of this invention, each of the following tasks must be performed when building a logical schema:

1) open the database for which the logical schema is to be built,
2) name the logical schema,
3) select the tables to be included in the logical schema,
4) specify the relationships between the rows of data in the various tables that comprise the logical schema, and
5) specify the joins between the columns of the selected tables.

The following tasks are optional when creating a logical schema and may be performed in any order:

1) select columns to be included in the logical schema from the set of chosen tables,
2) arrange how the columns are to appear to end users when building forms and reports,
3) create aliases for tables or columns,
4) establish a default sort order for the data retrieved into the forms or reports based on the logical schema, and
5) determine which users will be able to use the logical schema.

In the preferred embodiment, each stage in the creation process is accomplished by entering information in, or making selections from, a series of dialog boxes displayed by a GUI.

Logical Schema Storage

Once a logical schema is created, it may be stored in either the same database from which the tables defining the logical schema were stored or in a separate database. FIG. 4A is a block diagram representing how a logical schema is stored. Usually a database includes two type of tables, user tables 38 and system catalog tables 40. User tables 38 store information sought by the end user, while system catalog tables 40 contain information concerning objects of interest to the database system itself. A logical schema is stored in logical schema tables 42, shown by the dashed rectangles, as a type of system catalog table 40.

Logical Schema Creation Stages

This section describes in greater detail the stages required to create a logical schema. As described earlier, a logical schema is created and subsequently used by an end user through a GUI. The implementation of a GUI and manipulation of a database through a software controlled DBMS are well known in the art and will not, therefore, be described in detail. However, both the logical schema creation process and the operation of a logical schema by an end user are explained in detail using the customer and sales invoice example described above and depicted in FIG. 3. The stages taken to create this logical schema are described in sequence below.

STAGE I: NAMING THE LOGICAL SCHEMA AND SELECTING TABLES TO DEFINE THE LOGICAL SCHEMA.

At this stage, the database for which a logical schema is to be created is opened and then the new schema is named. Logical schemas are created for a currently open database. Tables included within a logical schema can be tables in the current database or SQL views as well as synonyms to tables in remote databases. A SQL view is an image of database tables formed by a query and then saved. In a preferred embodiment, remarks or a description of the logical schema may be entered in the same dialog box in which the logical schema is created for future reference.

Next, a list called "Available Tables" is established. The list includes the names of all tables, views and synonyms (a name used to reference another database) in the current database. A table may be added to the logical schema by selecting and moving (i.e., using a mouse) the table from the Available Tables list to a list called "Selected Tables".

FIG. 4B depicts the "Available Tables" list 200 and the "Selected Tables" list 202 for the sample customer invoice database. All tables in the database are displayed in the available tables list 200 and prefixed with the login name of the person who created the table. In the example shown, all the tables have an owner named, "Ifmx". For this example, it is assumed that customer table 132, store table 133, sales_header table 136, and sales_item table 137 are selected from the available tables list 200. The chosen tables are displayed in selected tables list 202 and are included in the logical schema. The name of the logical schema, "invoice", has been entered in the Logical Schema Name box 139.

Once tables for the logical schema are selected, and they appear in the selected tables list 202, an alias, label, and title for each table may be specified. An alias is a secondary name that is recognized by the DBMS. If an alias for a table is not specified, the logical schema uses the original table name as the alias. The reason a table name is given an alias is to make the name more meaningful to an end user who will later create forms and reports using the logical schema.

In a preferred embodiment, aliases must be valid SQL identifiers. They must be unique in the logical schema and can only contain alphabetical characters. If a table is selected twice for a logical schema, a routine is called to automatically rename or alias the table. In a preferred embodiment, this is done by appending an underscore character to the name. For example, "employee" table is selected twice, the second occurrence of the table is renamed as "employee_".

The first table inserted into the selected tables list 202 is designated by default as the logical schema master table. This designation may be changed if desired. In FIGS. 3 and 4B, the customer table 132 is the master table 30.

STAGE II: STORING THE LOGICAL SCHEMA

A command, such as "Create Logical Schema", may be entered to store the above-mentioned information in logical schema tables 42 of FIG. 4A. Referring back to FIGS. 2 and 4A, logical schema tables 42 are used both by DBMS 16 when logical schema 12 is created, and when end user 8 uses logical schema 12 to create a form or report. During creation of logical schema 12, the logical schema tables 42 are used by DBMS 16 to store information which defines logical schema 12. When end user 8 invokes logical schema 12 to create a form or report, DBMS 16 accesses the logical schema tables 42 to retrieve table and relationship information. This information is then used to construct SQL statements that will fetch data.

FIGS. 5-10 depict six logical schema tables 42 of FIG. 4A. These tables are called SYSSUPERVIEWS, SYSSVWTABLES, SYSSVWJOINS, SYSSVWALIASES, SYSSVWORDER, and SYSSVWAUTH, respectively. Note, the columns headings contained in the tables in FIGS. 5-10 are listed along the left hand side of rows in the figures. Also, in this embodiment of the present invention, a logical schema is referred to as a "SuperView", hence the name SYSSUPERVIEWS for the table of FIG. 5.

Below is a brief description of each logical schema catalog table as implemented in this embodiment. The SYSSUPERVIEWS table of FIG. 5 contains information about the names, owners, and descriptions of logical schemas for a database.

The SYSSVWTABLES table of FIG. 6 defines the database tables and views used in a logical schema and the relationships between those tables. Every instance of a table, including the master table, is represented as one row. Level names are defined for tables joined in a One-to-One-or-More or One-to-Zero-or-More relationship.

The SYSSVWJOINS table of FIG. 7 contains information about how the logical schema joins columns.

The SYSSVWALIASES table of FIG. 8 contains information about column aliases defined within the logical schema.

The SSYSSVWORDER table of FIG. 9 defines the sort order of the joins specified in the logical schema.

The SSYSSVWAUTH table of FIG. 10 controls logical schema authorizations for end users.

Referring to FIGS. 5-10, each of the logical schema tables is indexed to improve table access time. Indexing of tables in a relational database is well known in the art and will not therefore be explained in detail. A brief overview of indexing is provided, however, in order to describe how the logical schema tables are indexed.

Indexing can be explained by the following analogy: when a particular item needs to be found in a book, a search of the book's index for a pointer (page number) indicates where the item is located in that book. Likewise, in a database, when a table has been indexed it means that a file has been created to point to the location where frequently accessed data is stored in that table.

Index files contain paired lists of data values and pointers. The data values are the values from a particular column in an indexed table, and the corresponding pointer identifies where in the indexed table the data value is located. In FIG. 5, for example, the SYSSUPERVIEWS table has two indexes, superview1 and superview2. Superview1 indexes the SYSSUPERVIEWS table based on the column 'svwid' while superview2 indexes the SYSSUPERVIEWS table on both the columns 'owner' and 'SVWNAME'. When the DBMS needs to locate all logical schemas with an owner named "Smith," for example, the index superview2 for the column 'owner' is searched for a data value corresponding to "Smith". When this value is found in the index file, the pointer for this value indicates where the record can be found in the SYSSUPERVIEWS table. This eliminates the need for a sequential search of the indexed table.

The two types of indexes used in the present invention are unique and duplicate indexes. A unique index does not allow duplicate values in a column, while a duplicate index does allow duplicate values. In the SYSSUPERVIEWS table, the indexes are unique meaning that no duplicate index values for 'svwid' and 'svwname' are permitted in the indexed files.

As stated above, after a command, such as "Create Logical Schema" has been invoked, the information corresponding to the newly-created logical schema is stored in the logical schema tables 42 of FIG. 4A. In a preferred embodiment, the logical schema tables SYSSUPERVIEWS of FIG. 5, SYSSVWTABLES of FIG. 6, and SYSSVWALIASES of FIG. 8, contain data concerning the newly created logical schema.

The SYSSUPERVIEWS table contains information about the names, owners, and descriptions of logical schemas for a database. For each logical schema created, one row of information is inserted into SYSSUPERVIEWS.

FIG. 11 depicts the row of information inserted into the SYSSUPERVIEWS table for the invoice logical schema being created in the present example. The column 'svwid' is a serial data type which is assigned automatically and is unique for each logical schema. Assuming this is the first logical schema created, then 'svwid' is assigned the value of one. The column 'owner' contains the logical schema owner's login name. In this example, the owner's name is "Ifmx". The columns 'svwname' and 'remarks' are the character strings entered for the logical schema name and its description, respectively.

The second table to receive data is the SYSSVWTABLES table (FIG. 6). The SYSSVWTABLES table defines the database tables used in a logical schema and the relationships between those tables. One row of data is inserted into the SYSSVWTABLES table for each table chosen for the logical schema. In the present example, four tables were chosen, thus four rows of information are inserted into the SYSSVWTABLES table.

FIG. 12A depicts the SYSSVWTABLES table after the four rows have been inserted. The column 'svwid' matches the svwid value automatically generated when the SYSSUPERVIEWS row was inserted. The column 'tableseq' is undefined at this point for all four tables because column sequencing has not yet been defined. The column 'owner' contains the owner's login name for each table as in the SYSSUPERVIEW table. The columns 'owner' and 'tabname' are determined from the character strings found in the available tables list 200 of FIG. 4B.

The columns 'masteralias' and 'cardinality' of the SYSSVWTABLES table are undefined at this point except for the master table, because relationships between the tables have not yet been established. The Customer Table is the master table, therefore the 'cardinality' column for that row is assigned the value of 'M'. The remaining columns receive NULL values. Column 'usetype' defines whether the table may be updated (U) or is look-up only (L). In the preferred embodiment, the value of 'usetype' is always "L".

The column 'tabalias' is assigned the table alias string which appears in the selected tables list 202 of FIG. 4B. If the tables aliases have not been established, then the 'tabalias' column is assigned the name of the original table. As shown, the Sales_Header table has been given an alias of "Sales_Info".

The column 'levelname' is undefined at this point because logical schema levels have not yet been defined. Therefore, in FIG. 12A, a NULL is entered for the 'levelname' column in each row. No remarks have been entered in the remarks column.

The SYSSVWALIASES table of FIG. 8 is the third table to receive values when the logical schema is created. The SYSSVWALIASES table contains the information about column aliases defined within logical schemas. One row is inserted into this table for each column contained in each table selected for the logical schema.

FIG. 13 depicts the SYSSVWALIASES table after data has been inserted for the "invoice" schema. In this example, the tables for the logical schema contain the columns as shown in FIG. 12B. These same columns are listed under the 'colname' column as shown in FIG. 13 for each table.

Entries in the column 'svwid' in the SYSSVWALIASES table of FIG. 13 match the svwid value automatically generated when the "invoice" logical schema was created and corresponds to the 'svwid' in SYSSUPERVIEWS of FIG. 12A. Column 'tabalias' contains table alias strings corresponding to the tables for which one column aliases are being stored. Entries in column "colname" are the actual column names in the original table. Column 'colseq' indicates the order of how columns will be displayed and is assigned 0 at this point for all column names.

The column 'colalias' is an alias which will identify a particular column uniquely in the logical schema. It is, by default, the original column name. If two tables are selected that contain a column with the same name, the second occurrence of the column is automatically aliased by appending an underscore character after the name. For example, the tables Customer and Sales_Info contain a column named custnum, so that the column in the second table is automatically aliased to custnum_, as shown.

Entries in the columns 'label' and 'title' are the same as 'colalias' at this stage. Entries are inserted into the column 'flag' when a view, rather than a table, is used to define the logical schema. At this stage the entries in the flag column are set to zero.

At this stage in the creation process, only information concerning the selected tables is inserted into the SYSSVWALIASES table. Information concerning the column aliases is defined in later stages.

STAGE III: DEFINING THE RELATIONSHIPS OF THE LOGICAL SCHEMA.

The most important task in defining a logical schema is establishing the relationships between logical schema tables. When a logical schema is first created, only the logical schema master table is defined, and no relationships among the remaining tables have been specified. Therefore, in the present example, the relationships among the four tables selected must be created for the "invoice" logical schema. The exact steps to follow to define the relationships vary according to the specific embodiment of the GUI employed.

To define a relationship, two tables from the logical schema, and the type of relationship or the cardinality of the relationship between the tables are selected. As described above, the types of relationships that can be defined in a logical schema are One-to-One, One-to-Zero-or-One, One-to-Zero-or-More, and One-to-One-or-More.

Once the relation is defined, columns from the two tables, and an operator that defines how the selected columns in the two tables are to be joined are selected. Two columns can be joined by the following join operators:

Equal=
Not equal<>
Greater than>
Greater than or equal to>=
Less than<
Less than or equal to<=

The join operators define how tables are joined based on the values of the join columns. In the example where the customer table is joined with the store table through the 'storenm' column, the "equal" join operator will join the two tables when the value of 'storenm' is the same in both tables. For most cases, the "equal" join operator is used to join two columns because most columns are joined when they have values which are equal. The other join operators are available for occasions when the "equal" operator is not sufficient to join two columns for a particular application.

The "not equal" operator joins two columns when the value of the first column is not equal to the value of the second column. The "greater than" operator joins two columns when the value of the first column is greater than the value of the second column. The "greater than or equal to" operator joins two columns when the value of the first column is greater than or equal to the value of the second column. The "less than" operator joins two columns when the value of the first column is less than the value of the second column. The "less than or equal to" operator joins two columns when the value of the first column is less than or equal to the value of the second column.

FIG. 14 shows how a DBA could specify the relationships of logical schema "invoice" according to FIG. 3. Lines 1, 3 and 5 indicate the logical schema relationships between the entities represented by the tables, and lines 2, 4 and 6 show how tables are to be joined in the physical database. The Customer and Store tables are joined through the storenm column entries; as shown on line 2. The Customer and Sales_header tables are joined through the custno column entries as shown on line 4; and the Sales_header and Sales_items entries are joined through the salesno column entries as shown on line 6.

The first table chosen in logical schema relationship is the Master or Parent table of the relationship. Each Master or parent table is joined to at least one detail table. This join between a parent table and a detail table provides a logical pair of tables. In the example, the tables on the left-hand side of each logical pair of tables of the logical schema relationship definitions of lines 1, 3 and 5 are master or parent tables while the tables on the right-hand side are the detail tables for those relationships. As stated above, every One-to-One-or-More or One-to-Zero-or-More relationship between logical pairs of tables adds a new logical schema level to the logical schema. Therefore, the relationship of the Customer table to the Sales_Header table of line 3 creates a first detail level and the relationship of the Sales_header table to the Sales_items table of line 5 creates a second detail level, as shown in FIG. 3.

The names of logical schema levels may be automatically assigned by the DBMs. The first level of the logical schema takes the name of the logical schema master table. All other logical schema levels take the name of the first table chosen in each One-to-One-or-More or One-to-Zero-or-More relationship.

STAGE IV: STORING THE RELATIONSHIPS

After the relationship definitions between tables in a logical schema are completed, the DBMS stores the information in the logical schema tables 42 of FIG. 4A. When a command is issued to apply the specified relationships, the DBMS updates the SYSSVWTABLES table and inserts new information regarding the joins into SYSSVWJOINS table.

FIG. 15 shows the SYSSVWTABLES table after being updated with the relationship information specified above. The column 'tableseq' has been updated to reflect the hierarchy of tables in the logical schema. The table sequencing can be performed in a variety of ways, but in this embodiment the values in column "tableseq" are assigned as follows:

a) The logical schema master table is always assigned a value of "1". Thus, in FIG. 15 the Customer table is the master table.

b) The logical schema hierarchy is traversed beginning at the master table, and the detail tables are assigned tableseq values sequentially based on the order the relationships were defined. In the sample logical schema of the present example, the first relationship defined was between the customer table and the store table. Therefore, the 'tableseq' column for the store row is assigned a "2". The second relationship defined in the sample logical schema was between the customer table and the Sales_header table, so the 'tableseq' column in the Sales_header row is assigned the value of "3". The last relationship defined was between the Sales_header table and the Sales_items table, so the sales_items table is assigned the value of "4".

Next, the column 'masteralias' in the SSYSVWTABLE table is assigned the alias of the parent table. Because the design of the logical schema dictates that any table can have only one master table, the logical schema master table has no master, so it is assigned a NULL value. The Store table and the Sales_header table are both detail tables of the Customer table, so the 'masteralias' entries are assigned the value of "Customer".

The column 'cardinality' in SYSSVWTABLES is assigned a code identifying the number of rows in the detail table per one row in the parent table. The logical schema master table is always assigned a value of "M", which stands for Master. The remaining tables are assigned one of the following codes: value of "1" means that there is always one row per master row; value of "0" means that there are zero or one row per master row; value of "n" means there are zero or more rows per master row; value of "N" means there is one or more rows per master row.

In this sample logical schema, the cardinality entry for the Store table row is a "1" because there is always one row of the Store table per customer in the Customer table. The cardinality entry for the Sales_header table row is assigned an "N" because one or more rows exist in the Sales_header table per row in the Customer table.

The 'levelname' entries in the SYSSVWTABLES are set so that all tables at a given detail level share a level name. By default, the 'levelname' entries are assigned the table alias of the table that initiated that level. The Customer and the Store tables are both in the master level and the 'levelname' column is assigned the name of the master table, "Customer". The Sales_header table is in its own detail level and its 'levelname' column is given the alias for that table, "Sales_Info". The Sales_items table is in its own detail level and its 'levelname' column is assigned the name of the Sales_items table.

FIG. 7 depicts the SYSSVWJOINS table which also contains information about the logical schema relationships. One row of data is inserted into the SYSSVWJOINS table for each join defined in the logical schema. Three relationships between tables, namely the Customer Store relationship of lines 1 and 2, the Customer Sales_Info relationship of lines 3 and 4, and the Sales_Header Sales_Items relationship of Lines 5 and 6 were defined in the sample logical schema shown in FIG. 14. Therefore, three rows are inserted into the SYSSVWJOINS table.

FIG. 16 depicts the SYSSVWJOINS table after being updated with the join information from the example schema of FIG. 3. The 'svwid' entries match the svvid value for the "invoice" logical schema which has a value of "1". The 'tabalias' entries identify the table aliases of the tables being joined.

The column 'jcolseq' is assigned the order of the joins for a given relationship. Tables may be joined on more than one column. When this occurs, SYSSVWJOINS tables receives an additional row for each column in the table being joined. For example, if the store table was joined with the customer table by two columns, then another store table row would be inserted into the SYSSVWJOINS table and the column 'jcolseq' for the new row would contain the value of "2". In the example logical schema of FIG. 3, since all the tables are joined by a single column (not composite joins), the entries are assigned the value "1".

The entries in the 'mastercol' identify the join columns specified on the parent side of the joins. As shown in FIGS. 14 and 16, the Store table is joined with the master Customer table by the column "storenm". The Sales_header table, alias Sales_Info, is joined with the master Customer table by the column "custnm". The Sales_items table, alias Sales_Items, is joined with the Sales_header table by the column "salesnm".

Entries in column 'detailcol1' in the SYSSVJOINS table identify the join column specified on the detail side of the joins. In the example, the detail column names are the same as the column names in the parents tables, and are therefore appended with an underscore. The column 'detailcol2' may be used when a "between" join operator, i e., where x is between "2" and "20", has been selected When this occurs, detailcol1 holds one value specified in the between statement and detailcol2 would hold the second value.

In the SYSSVWJOINS table, the entries in the column 'joinoperator' are assigned the value of the selected join operator. As shown in FIGS. 14 and 16, all three joins were defined with the "=" join operator.

Logical Schema Options

Once the logical schema tables have been updated, a complete, valid logical schema exists. The steps, or functions, described below are available as options after the schema creation process.

A) CHANGING TABLE AND COLUMN ALIASES AND LEVELNAMES.

When end users use the logical schema to create a form or report, they may be given a list of columns in the logical schema from which to choose. The original names of columns in databases may not be descriptive of their contents, and it may be helpful to provide more descriptive names. For example, "custnum" columns could be changed to the more meaningful alias of "Customer Number".

As stated above, column and table aliases are automatically assigned the name of the original column or table. In a preferred embodiment, the automatic aliases can be edited after the creation of the logical schema.

When a table alias is modified, the DBMS causes the following events to occur:

1) In the SYSSVWTABLES table each entry in the tabalias column corresponding to the table whose alias was changed, is updated.

2) Any table that joins to the 'tabalias' column in the SYSSVWTABLES table causes the following columns in the corresponding tables to be updated: the column 'tabalias' the SYSSVWJOINS table, the column 'tabalias' in the SYSSVWALIASES table, and the column 'masteralias' in the SYSSVWTABLES table is updated when it contains a value that is the same as the tablealias that is currently being modified.

Like table aliases, a column aliases can be modified after the creation of a logical schema. When this occurs the DBMS takes the following steps:

1) The row corresponding to the table whose column alias was changed is updated in the SYSSVWALIASES logical schema table.

2) Any logical schema table that includes columns referring logical schema column information is also updated based on the value of the previous column name. This includes the 'mastercol' column in the SYSSVWJOINS table, the 'detailcol1' in the SYSSVWJOINS table, and 'colalias' in the SYSSVWORDER table. If column labels or titles are changed, then the corresponding row in SYSSVWALIASES is updated by changing the 'label' and/or 'title' fields. Labels and titles are placed on forms and reports, respectively, next to data fields.

The logical schema level names can also be modified after the creation of a logical schema. When this occurs the DBMS updates the level name entries in SYSSVWTABLES to reflect the new name.

B) LOGICAL SCHEMA COLUMN ORDER

In a preferred embodiment, the DBA has the capability to control which columns are displayed and in what order they appear, when end users access a logical schema. When end users design a form or report, they make selections from a dialog box listing all the columns in the logical schema. The columns they select are pasted onto the form or report in the order they are listed in the dialog box.

In the preferred embodiment, columns in the logical schema are listed in the dialog box shown to the end user by default in alphabetical order. Once they are pasted onto the form or report, the end user may have to rearrange the columns to a more useful order. If the DBA can anticipate how end users are likely to use the columns, the DBA can change the default arrangement and reorder the columns in the logical schema. This saves end users from having to reorganize the columns on their forms or reports.

Column ordering is controlled by entries in the colseq column of SYSSVWALIASES. The logical schema columns are simply displayed in numerical order of the colseq entries. When the column ordering is altered, the 'colseq' entries for those columns are updated.

Columns in a logical schema may also be hidden from the user by assigning the colseq entry a negative value. For example, assume the colseq entries for city and state in the Customer table of FIG. 13 contained values of "4" and "5", respectively. Those columns may be hidden by changing the respective values to "−4" and "−5", thereby maintaining information regarding the prior order.

C) LOGICAL SCHEMA SORTING

In a preferred embodiment, the DBMS may be instructed how to order the records returned in all the forms and reports. The basic order of the returned data is determined by the hierarchy of the logical schema. For example, in the "invoice" logical schema containing a customer level, a sales_header level, and a sales_items level, for every row of customer information, a number of rows of information about each sale may be returned. Likewise, for each row of sales information, a number of rows of information about the items that made up the sale is returned.

The default sort order in the logical schema determines the order of returned rows within each logical schema level. For example, it can be specified that all the rows of customer data be sorted in alphabetical order by last names; that all the sales information be sorted by the date of sale, beginning with the most recent date; and that all items on each sales order be sorted by item number.

When a sort order is defined for a logical schema, one row corresponding to each sort column specified is inserted into the logical schema table SYSSVWORDER of FIG. 9. The SSYSSVWORDER table defines the sort order of the joins specified in the logical schema. FIG. 17 shows the SYSSVWORDER table after a sort order has been defined based on the last name of the customer and the item name. The column 'svwid' in the SYSSVWORDER table matches the svwid value for the logical schema, i.e. "1".

Entries in the column 'colalias' specify the logical schema columns that are to be sorted. In the example of FIG. 17, the column aliases 'lname' and 'itemnm' indicate that the entries are to be sorted by last name and item numbers. Entries in column 'sorttype' indicate whether the entries should be sorted in ascending (A) or descending (D) order.

The entries 'seqno' indicate the order sorting operations are performed. For example, the assignment of the value "1" to the seqno entry for lastname sorting and the assignment of the value "2" to the seqno entry for item number sorting, as shown in FIG. 17, causes sorting first by last name and then by item numbers.

D) LOGICAL SCHEMA RESOURCES

It may be the responsibility of a DBA to weigh the end user's desire for information against the DBA's responsibility to maintain the security and efficiency of the database resources. Therefore, in a preferred embodiment of the invention access to a logical schema can be controlled; limits can be placed on the query resources of the end user; and how records are locked, i.e., made inaccessible, when the user queries the database can be controlled.

All end users are initially granted SELECT privilege on all new logical schemas, meaning that all end users have access rights to the logical schemas. Who can use a logical schema can be limited by revoking the SELECT privilege from specific end users. An end user can design a form or report based on only the logical schemas to which the end user has SELECT privileges.

FIG. 10 depicts the SSYSSVWAUTH table which controls logical schema authorizations for end users. For each user specified as having logical schema SELECT privilege, one row is inserted into the SYSSVWAUTH table. The column 'svwid' matches the svwid value for the logical schema. The column 'username' is the login name of the user who has access. Column 'svwauth' defines the authorization type for the user. The remaining fields in the row are assigned the resource values that are directly entered for that user. For example, the 'rowlimit' field specifies how many rows of data can be read by a user. The column 'readsperrowlimit' limits the number of reads the DMBS can perform per row. The column 'elapsedtimelimit' specifies the maximum time for a read operation. The column 'isolationmode' defines how isolated a user is from other 'users' updates in the database.

Logical Schema End User Operation

As stated above, with the present invention, end users are capable of designing forms and reports through the use of a logical schema interface without knowledge of the physical database schema. The present invention allows end users to access database information through an intuitive "point and click" graphical interface with knowledge of SQL commands, keywords, or syntax being required. End users gain access to the data in a syntax independent of the physical database schema. The following describes a preferred implementation of the graphical interface for the end user logical schema.

To access the logical schema, the end user first specifies the database that will be the basis for the form or report. After the DBMS opens the database, a list of logical schemas that have been developed for that database appears in a dialog box. Only the logical schemas to which the end user has been provided access will appear in the list.

The end user then selects a logical schema and chooses a set of fields, which will form the basis of a form or report, from a list of available columns for that logical schema.

FIG. 18 depicts a sample dialog box displaying the master-detail level hierarchy of the "invoice" logical schema. Note that instead of displaying the actual tables and columns, the present invention hides the physical structure of the database by only displaying logical schema levels and the fields available in those levels.

A logical schema level may contain more than one table but is presented to the end user as a level name only. For instance, the customer level 129 consists of both customer and store tables, as shown in FIG. 3. The user need not know which tables contain the desired information. If columns in the tables have been given aliases, then the physical column names are also hidden from the end user.

When a logical schema is being created, table columns are displayed in the order they occur in the actual tables. When users invoke the logical schema to create a form or report, the columns of the logical schema are displayed in alphabetical order if the columns have not been resequenced. In FIG. 18, the displayed columns have been resequenced to appear in the order they exist in their respective tables.

Each logical schema level 28 is a collection of related fields capable of producing a specific type of record. For example, Customer level 129 is the Master level 29 and contains records for customer data as well as store data, including customer names, addresses, phone numbers, store names, sales numbers, and so on. The first detail level 34 is the Sales level 134 and contains records relating to sales information, including sales dates, salespersons, and sales numbers. The second detail level 35 is the Items level 135 and produces records relating to sales items, including sales numbers, item numbers, and so on.

The end user selects those fields 44 for which he wishes to see information. The fields 44 which the user selects are highlighted (shown by grey rectangles) and pasted onto the form or report by the DBMS in the order in which they are listed in the logical schema levels 28.

FIG. 19 is a sample form produced from the "invoice" logical schema. Using a form, an end user can customize the arrangement of data returned from the database. The selected master level data fields 46 selected by the end user from the Customer level 129 of FIG. 18, namely, lname, fname, phone, storenm, and storeid, are pasted individually into the top portion of the form window as individual data fields 48. Each data field is preceded by text 49 describing the field created by the end user when designing the form. Detail level data fields 50 from the Sales Item level 135, namely, salesdate, salesprsn, itemnm, itemno, price, and qty, are automatically placed in a Detail level scrolling table 52. A detail level scrolling table 52 is automatically generated by the DBMS whenever two tables are joined in a One-to-Many relationship. For example, a particular customer may have made several purchases at one store by several different salespersons, and each sale may include many sales items. Therefore, a scrolling table 52 is generated for both the Sales Info level and for the Items Level information in the end user's form. Note that only the fields selected by the end user in FIG. 18 appear on the form in FIG. 19. Using this feature of the present invention, the end user can control what information will be returned from the database.

After the end user has created a form or report by selecting fields, records from the database can be retrieved and viewed in the form the end user created by entering a command for the DBMS to query the database based on the fields in the form. The DBMS determines from the logical schema tables 42 of FIGS. 4A and 5–10, the physical tables and columns on which to perform the query. The table relationships and joins that have been defined in the logical schema determine the master-detail order of the returned data.

FIG. 20 shows the sample form after records have been retrieved from the database. Recall that a record is a row of data values obtained from a table. The related master and detail level records returned from the query are combined on the user's screen in the form to produce a composite record called a logical schema record 54. FIG. 20 shows that the customer with a last name of Smith, having a store number of G8392 purchased items from a store named X Co. The master level record 56 owns, or controls, the detail level records 58 displayed in each of the detail level scrolling tables 52. As further shown in FIG. 20, Smith's purchase on May 23, 1993 consisted of items called Widgets. Each of these items has a part number, listed in the column labelled "part number". When the end user issues a command to retrieve information regarding the customers other sales, new records retrieved from the database scrolling tables 52 replace the current records in the detail. The detail level scrolling tables 52 graphically depict the One-to-Many relationship between the Customer level and the Sales level and between the Sales level and the Sales Items level. Other forms with this format can be produced by the specification of other customers and sales dates.

It has been shown that the present invention provides a way for an end user to access data in a relationship database without knowledge of the structure of the database by using a logical schema derived from the physical schema of the relational database.

The present invention has been described in terms of a preferred embodiment. The invention, however, is not limited to the embodiment depicted and described. Rather, the scope of the invention is defined by the appended claims.

We claim:

1. A method for providing access to data stored in a plurality of relational database tables, each of said relational database tables having at least one field, comprising the steps of:

specifying at least one logical relationship by:
  selecting a pair of tables having a common field from among said plurality of relational database tables;
  selecting the common field of said pair of tables as a join field; and
  selecting a join operator for said join field to define a join between said pair of tables,
  the logical relationship being one of One-to-One, One-to-Zero-or-One, One-to-Zero-or-More, and One-to-One-or-More; and creating a logical schema defining a multilevel hierarchy of the tables in the specified logical relationships, wherein a first table and a second table of a pair of tables in a logical relationship are at an equal hierarchy level if the logical relationship is one of One-to-One and One-to-Zero-or-One and the first table is at a higher hierarchy level than the second table if the logical relationship is one of One-to-Zero-or-More One-to-One-or-More.

2. The method of claim 1, wherein said join operators are chosen from a set including: equals, not equal, greater than, greater than or equal to, less than, and less than or equal to.

3. The method of claim 1, further comprising the steps of;
displaying fields of tables in the logical schema multilevel hierarchy, the fields being arranged by hierarchy levels of the corresponding tables;

receiving input for a value of at least one of the displayed fields; and querying said relational database tables based on the received input and the logical relationships included in the logical schema.

4. The method of claim 3, further comprising the step of aliasing a field in said tables in said logical schema to provide a descriptive name for said field, wherein the step of displaying fields displays the aliased name for said field.

5. A computer system comprising:
a memory for storing a logical schema for providing an interface for a user to access data stored in a plurality of relational database tables, each of said relational database tables having at least one field, wherein the logical schema comprises a plurality of logical schema tables, each corresponding to a relational database table and participating in at least one logical relationship, each logical relationship comprising a pair of logical schema tables, a loin field common to both of the logical schema tables in the pair, and a loin operator for joining the pair of logical schema tables based on the join operator, the logical relationship being one of One-to-One, One-to-Zero-or-One, One-to-Zero-or-More, and One-to-One-or-More, the logical schema defining a multilevel hierarchy of the logical schema tables wherein a first table and a second table of a pair of tables in a logical relationship are at an equal hierarchy level if the logical relationship is one of One-to-One and One-to-Zero-or-One and the first table is at a higher hierarchy level than the second table if the logical relationship is one of the One-to-Zero-or-More and One-to-One-or-More; and a display for displaying fields of the logical schema tables.

6. A computer-implemented method for providing a hierarchical view of data stored in a plurality of relational database tables comprising the steps of:

providing a logical schema for at least two logical schema tables, each logical schema table corresponding to a relational database table, wherein the logical schema is defined by pairwise logical relationships between the logical schema tables, each logical schema table participating in at least one logical relationship, wherein a logical relationship is defined by a join operator on a join field common to both logical tables in the pair, and a logical relationship is one of One-to-One, One-to-Zero-or-One, One-to-Zero-or-More, and One-to-One-or-More; and establishing a multilevel hierarchy among the logical schema tables, wherein a first table and a second table of the pair of tables in each logical relationship are at an equal hierarchy level if the logical relationship is one of One-to-One and One-to-Zero-or-One, and the first table is at a higher hierarchy level than the second table if the logical relationship is one of One-to-Zero-or-More and One-to-One-or-More.

7. The method of claim 6, further comprising the step of displaying the logical schema as a multilevel hierarchy.

8. The method of claim 7, further comprising the step of displaying selected fields selected from the logical schema tables, the fields being arranged by hierarchy levels of the corresponding logical schema tables.

9. The method of claim 8, further comprising the steps of:
receiving input for a value of at least one of the displayed fields;

querying the relational database tables for data satisfying the input and the joins defining the logical relationships in the logical schema; and displaying data resulting from the query.

10. The method of claim 9, wherein the step of displaying data resulting from the query displays data corresponding to the fields selected for display, grouped in accordance with the hierarchy levels of the fields.

11. The method of claim 10, wherein data resulting from the query for each hierarchy level are displayed in a scrolling table.

* * * * *

UNITED STATES PATENT AND TRADEMARK OFFICE
CERTIFICATE OF CORRECTION

PATENT NO. : 5,701,453
DATED : December 23, 1997
INVENTOR(S) : Maloney, et. al.

It is certified that error appears in the above-identified patent and that said Letters Patent is hereby corrected as shown below:

In claim 5, lines 36 and 37, change "loin" to read --join--.

Signed and Sealed this

Seventh Day of April, 1998

Attest:

BRUCE LEHMAN

Attesting Officer

Commissioner of Patents and Trademarks